United States Patent [19]

Suzuki et al.

[11] Patent Number: 4,941,760
[45] Date of Patent: Jul. 17, 1990

[54] BALL BEARING TYPE TURBOCHARGER ROTOR ASSEMBLY

[75] Inventors: Osamu Suzuki; Noboru Ishida, both of Aichi, all of Japan

[73] Assignee: NGK Spark Plug Co., Ltd., Nagoya, Japan

[21] Appl. No.: 406,103

[22] Filed: Sep. 12, 1989

[30] Foreign Application Priority Data

Sep. 12, 1988 [JP] Japan .................. 63-227934

[51] Int. Cl.$^5$ .............................. F16C 19/04
[52] U.S. Cl. ................... 384/537; 384/551
[58] Field of Search .......... 384/537, 551, 280, 281, 384/584, 585, 490, 569

[56] References Cited

U.S. PATENT DOCUMENTS

| | | | |
|---|---|---|---|
| 3,365,256 | 1/1968 | Dardani et al. | 384/537 |
| 3,405,982 | 10/1968 | Krenn | 384/537 |
| 3,852,858 | 12/1974 | Van Der Horst | 384/280 |
| 4,820,060 | 4/1989 | Braune et al. | 384/551 |

Primary Examiner—Lenard A. Footland
Attorney, Agent, or Firm—Foley & Lardner, Schwartz, Jeffery, Schwaab, Mack, Blumenthal & Evans

[57] ABSTRACT

A rotor assembly consists of a rotor shaft having a shoulder, turbine wheel, inner ring of a ball bearing and spacer having an end face cooperating with the shoulder to clamp therebetween the inner ring. An aspect of the present invention resides in that a perpendicularity of the end face relative to a center axis of the spacer is equal to or smaller than 0.1% of an inner diameter of the spacer. A clearance is provided between the rotor shaft and the spacer so that the spacer is secured by press fitting to the rotor shaft only at the opposite end portions. Another aspect of the present invention resides in that the rotor assembly is constructed so as to satisfy at least one of the following two factors, i.e., (I) a volume of the clearance is equal to or smaller than 2% of that of an inner space of the spacer and (II) (D2–D1) is equal to or smaller than 2% of D1 where D1 is an outer diameter of the rotor shaft and D2 is an inner diameter of the spacer.

5 Claims, 5 Drawing Sheets

BALL BEARING TYPE TURBOCHARGER ROTOR ASSEMBLY

BACKGROUND OF THE INVENTION

1. Field of the Invention

The present invention relates in general to turbochargers for automotive engines and more particularly to a turbocharger rotor assembly adapted for support by ball bearings.

2. Description of the Prior Art

A turbocharger rotor assembly having a rotor shaft adapted for support by two ball bearings on the turbine side and compressor side is well known in the art and herein referred to as a ball bearing type turbocharger rotor assembly.

The rotor assembly includes, in addition to the rotor shaft, a turbine wheel, an inner ring of a turbine side ball bearing and a tubular spacer which are installed on the rotor shaft. The spacer is provided for locating an inner ring of a compressor side ball bearing relative to the inner ring of the turbine side bearing upon installation of the compressor side bearing on the rotor shaft.

Heretofore, measurement and correction of the unbalance of a turbocharger rotor has been performed in the state of the above described rotor assembly wherein the inner ring of the bearing and spacer are installed on the rotor shaft. In measurement of the unbalance, the rotor assembly is rotatably supported at the ball race of the inner ring.

A problem of the rotor assembly is that there is a difficulty in knownin a precise amount of its unbalance since an error in measurement of the unbalance tends to become large.

SUMMARY OF THE INVENTION

In accordance with the present invention, there is provided an improved rotor assembly for a turbocharger. The rotor assembly comprises a rotor shaft having a shoulder at one end, an inner ring of a ball bearing installed on the rotor shaft and a tubular spacer installed on the rotor shaft and secured to same by press fitting.

The tubular spacer has an end face which cooperates with the shoulder of the rotor shaft to clamp therebetween the inner ring.

An aspect of this invention resides in that the spacer is constructed so that a perpendicularity of the end face relative to a center axis of the spacer is equal to or smaller than 0.1% of an inner diameter of the spacer.

A clearance is provided between the spacer and rotor shaft so that that spacer is secured only at opposite end portions to the rotor shaft.

Another aspect of the present invention resides in that a volume of the clearance is equal to or smaller than 1% of a volume of an inner space of the spacer.

A further aspect of the present invention resides in that (D2−D1) is equal to or smaller than 2% of D1 where D1 is an outer diameter of the rotor shaft and D2 is an inner diameter of the spacer.

The above structure is effective for solving the above noted problem inherent in the prior art device.

It is accordingly an object of the present invention to provide an improved rotor assembly for a turbocharger which makes it possible to know a precise amount of its unbalance and mend or correct the unbalance accurately.

It is a further object of the present invention to provide an improved rotor assembly of the above described character which can prevent or at least efficiently reduce the vibration and noise of the turbocharger otherwise occuring.

It is a futher object of the present invention to provide an improved rotor assembly of the above described character which can attain a reliable and quiet operation of the turbocharger.

It is a further object of the present invention to provide an improved rotor assembly of the above described character which can improve the durability of the turbocharger.

DESCRIPTION OF THE PREFERRED EMBODIMENTS

Figure 1:
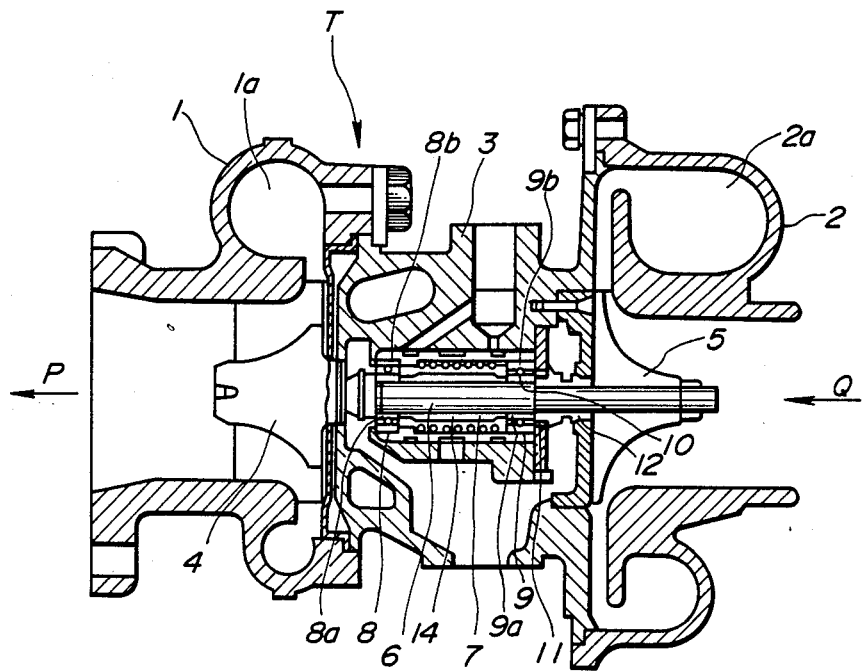
FIG. 1 is a longitudinal sectional view of a turbocharger incorporating a rotor assembly according to the present invention.

Referring first to FIG. 1, a tubocharger T includes a turbine housing 1 and compressor housing 2 on the opposite sides of a center housing 3. A rotor shaft 6 is stepped to have a shoulder 6a on the turbine side and rotatably supported on the center housing 3 by way of two ball bearings 8, 9. The ball bearing 8 is disposed on the turbine side and consists of an inner ring 8a, a plurality of balls 10 and an outer ring 8b. The ball bearing 9 is disposed on the compressor side and consists of an inner ring 9a, a plurality of balls 10 and an outer ring 9b. The inner rings 8a, 9b are installed on the rotor shaft 6 and secured to same by press fitting while the outer rings 8b, 9b are installed on the center housing 3. A turbine wheel 4 is disposed within the turbine housing 1A and installed on the rotor shaft 6. A compressor wheel 5 is disposed within the compressor housing 2 and installed on the rotor shaft 6. A tubular spacer 7 is installed on the rotor shaft 6 for locating the bearings 8, 9 relative to each other. The spacer 7 is secured at the opposite inner circumferential end portions to the rotor shaft 6 by press fitting and has an end face 7a which cooperates with the shoulder 6a of the rotor shaft 6 to clamp or hold therebetween the inner ring 8a of the ball bearing 8. Indicated by 11 is a retainer and indicated by 12 is a spacer. The retainer 11 is adapted for contact with the outer ring 9b of the bearing 9 for holding the same axially in place. The spacer 12 is adapted to installed on the rotor shaft 6 and cooperate with the other end face 7b of the spacer 7 to hold therebetween the inner ring 9b of the ball bearing 9.

Figure 3:
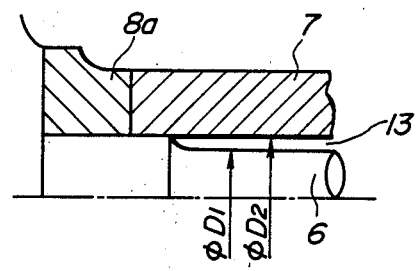
FIG. 3 is a fragmentary sectional view of the rotor assembly of FIG. 1 and formed with a clearance between a rotor shaft and spacer.

The rotor shaft 6 is made of metal and has, as shown in FIG. 3, a smaller diameter portion except for the portion at which it is secured by press fitting to the spacer 7 so that a clearance 13 is defined between the rotor shaft 6 and the spacer 7. The clearance 13 is provided with a view to reducing the force required for securing by press fitting the spacer 7 to the rotor shaft 6. The clearance may otherwise be formed between the rotor shaft 6 and spacer 7 as shown in FIGS. 4 and 5.

Figure 4:
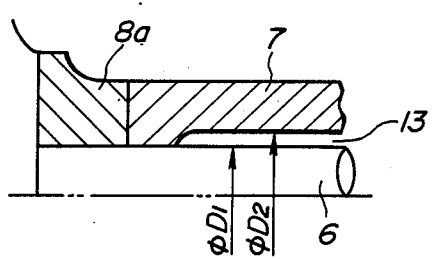
FIGS. 4 and 5 are views similar to FIG. 3 but showing variants.

In the arrangement of FIG. 4, the spacer 7 has at the inner circumferential surface a larger diameter portion except for the portion at which it is secured by press fitting to the rotor shaft 6 so that the clearance 13 is defined between the rotor shaft 6 and the spacer 7.

Figure 5:
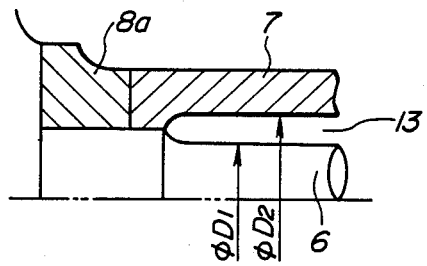

In the arrangement of FIG. 5, the rotor shaft 6 and the spacer 7 have resepective smaller diameter and larger diameter portions so that the clearance 13 is defined therebetween.

In operation, the turbine wheel 4 rotates being driven by the exhaust gases which flow through an exhaust passage 1a of the turbine housing 1 toward an unshown exhaust pipe (i.e., in the direction indicated by the arrow P) and thereby drives the compressor wheel 5 by way of the rotor shaft 6. The compressor wheel 5 draws in the direction indicated by the arrow Q air having passed an unshwon air cleaner and compresses and delivers the same to the intake port of the engine (not shown) through an air passage 2a.

Figure 2:
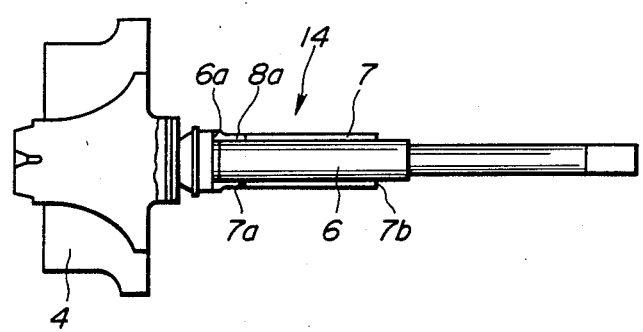
FIG. 2 is an elevation view of a rotor assembly of FIG. 1 and used for measurement of its unbalance.

A rotor assembly 14 to which the present invention is directed consists of the rotor shaft 6, an inner ring 8a of the bearing 8 on the turbine side, spacer 7 and turbine wheel 4 as shown in FIG. 2.

Heretofore, it has been practiced to measure and mend or correct the unbalance of a turbocharger rotor in the state of the rotor assembly shown in FIG. 2. In measurement of the unbalance, it is necessary to rotatably support the rotor assembly 14 at the ball race of the inner ring 8a. Due to this, when the circularity of the ball race of the inner ring 8a is poor, a disturbance as vibration, etc. is caused in measurement of the unbalance of the rotor assembly 14, thus making it impossible to know a precise amount of the unbalance and accurately mend or correct the same.

In accordance with the present invention, it is found that the perpendicularity of the opposite end faces of the spacer 7 relative to its center axis is closely related to the circularity of same when the spacer 7 is installed on the rotor shaft 6. That is, when a spacer of a poor perpendicularity is installed on a rotor shaft, an inner ring of a bearing is subjected at an end face to axial loads which are irregularly distributed along the circumference of the inner ring. Due to this, the ball race of the inner ring protrudes radially irregularly to deteriorate the circularity or the spacer flexes such that it is installed eccentrically on the rotor shaft, thus increasing an error in measurement of the unbalance. For the above reason, when the spacer of a poor perpendicularity is installed on the rotor shaft, measurement of the unbalance of the rotor assembly becomes unstable.

In accordance with one embodiment of the present invention, the perpendicularity of the opposite end faces of the spacer 7 relative to its center axis is set equal to or smaller than 0.1% of the inner diameter of the spacer 7. By this, the error in measurement of the unbalance of the rotor assembly 14 can be made equal to or smaller than 1 mg (milligram) and therefore it becomes possible to accurately mend or correct the unbalance of the rotor assembly 14.

In accordance with the present invention, it is also found that when the clearance 13 between the rotor shaft 6 and spacer 7 is of a large volume, a large quantity of lubricant remains in the clearance 13 to increase the error in measurement of the unbalance of the rotor assembly 14, which lubricant is used at the time of press fitting of the spacer 7 on the rotor shaft 6. Further, upon assembly of the turbocharger, oil will intrude into the clearance 13 to further increase an error in measurement of the unbalance of the rotor assembly 14. For the above reason, when the clearance 13 is larger than a predetermined value, it is impossible to know a precise amount of the unblanance and accurately mend or correct the unbalance of the rotor assembly 14.

In accordance with another embodiment of the present invention, the rotor assembly 14 is constructed so as to satisfy at least one of the following factors.

(I) The volume of the clearance 13 is equal to or smaller than 1% of the volume of the inner space of the spacer 7.

(II) Assuming that the inner diameter of the spacer 7 at the portion defining the clearance 13 is D2 and the diameter of the rotor shaft 6 at the portion defining the clearance 13 is D1, the rotor shaft 6 and spacer 7 are designed so that D2−D1 is equal to or smaller than 2% of D1.

Figure 6:
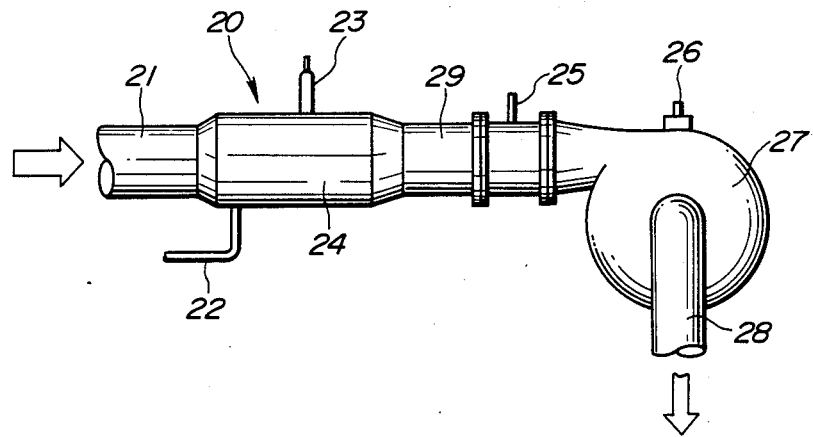
FIG. 6 is an elevational view of a testing device used for testing the rotor assembly of FIG. 2 for its vibration.

The rotor assembly having at least one of the above described three factors is tested for its rotational ability at high temperature by using a testing device shown in FIG. 6. The testing device 20 consists of a pressurized air pipe 21, burner 24, combustion gas passage 29, turbine housing 27 and exhaust pipe 28. Within the turbine housing 27 the rotor shaft 6 in the state shown in FIG. 2 is rotatably supported by way of the inner ring 8a on the turbine side and by way of an unshown journal bearing within the turbine housing 27 on the compressor side. The burner 24 has attached thereto a fuel supply pipe 22 and an igniter 23. The combustion gas passage 29 has attached thereto a thermocouple 25. The turbine housing 27 has attached thereto a vibration detector 26. Pressurized air is supplied into the pressurized air pipe 21 as indicated by the arrow and then into the burner 24. Fuel is supplied from the fuel supply pipe 22 into the burner 24 and iginited by the igniter 23 to burn. The burnt gas flows through the burnt gas passage 29 into the turbine housing 27 to rotate the tubine wheel 4 at high speed. In this instance, the temperature of the burnt gas is detected by the thermocouple 25. Vibration caused by rotation of the turbine wheel 4 and rotor shaft 6 is detected by the vibration detector 26. When the rotor shaft 6 rotates at the speed of 150,000 rpm under the condition where the temperature at the inlet of the turbine is 900 C., it is desirable from the point of view of the durability of the bearings and the noise of the turbocharger that the vibration of the rotor assembly 14 is equal to or smaller than 3 G where G is acceleration of gravity. Tests are also conducted about the relation between the above described volumetric ratio and the error in measurement of the unbalance of the rotor assembly 14 and about the relation between the above described diametrical ratio and the error in measurement of the unbalance. Test results are shown in FIGS. 7 to 9.

Figure 7:
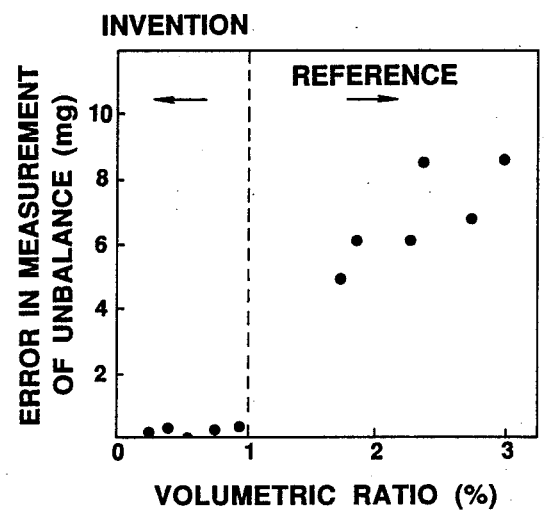
FIG. 7 is a graph showing the relation between the volumetric ratio of the clearance relative to the inner space of the spacer and the error in measurement of the unbalance of the rotor assembly.
Figure 8:
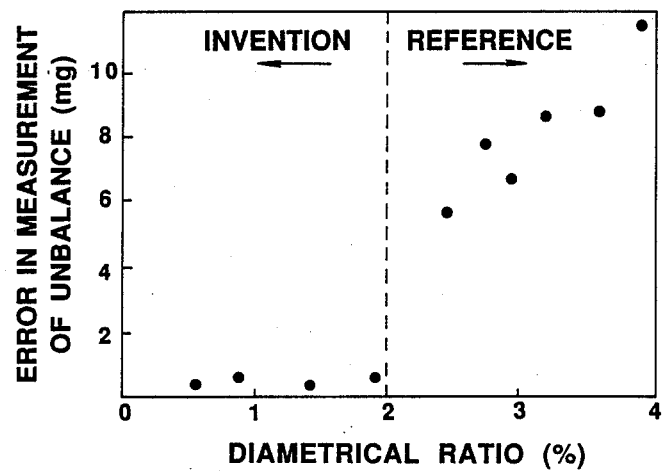
FIG. 8 is a graph showing the relation between the diametrical ratio of the clearance obtained based on the inner and outer diameters of the spacer and rotor shaft and the error in measurement of the unbalance of the rotor assembly.

As seen from FIGS. 7 and 8, when the volumetric ratio (i.e., ratio of volume of clearance 13 to volume of inner space of spacer 7) is equal to or smaller than 1% or when the diametrical ratio (D2-D1/D1) is equal to or smaller than 2% or when the above two factors are satisfied, the error in measurement of the unbalance of the rotor assembly 14 can be equal to smaller than 1 mg since only a small amount of lubicant is filled uniformly within the clearance 13.

Figure 9:
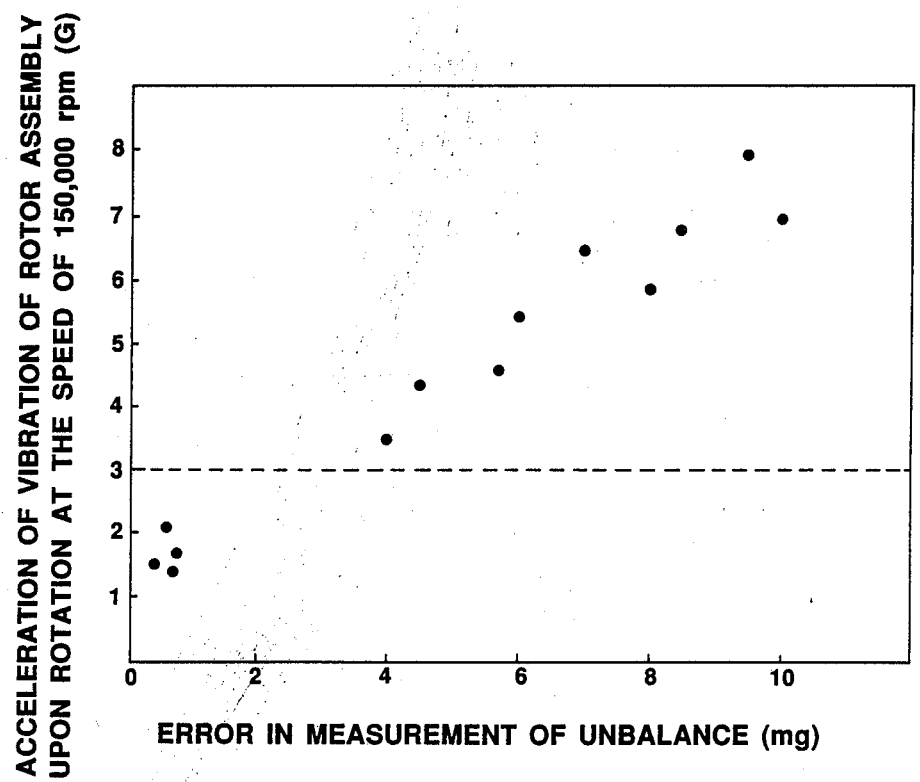
FIG. 9 is a graph showing the relation between the error in measurement of the unbalance of the rotor assembly and the acceleration of vibration of the rotor assembly upon rotation of the rotor assembly at the speed of 150,000 rpm.

FIG. 9 shows the relation between the error in measurement of the unbalance of the rotor assembly 14 and the acceleration of vibration upon rotation of the rotor assembly 14 at the speed of 150,000 rpm. As seen from this graph, the acceleration of vibration of the rotor assembly 14 varies substantially proportionally to the error in measurement of the unbalance of the rotor assembly 14. However, when the error in measurement of the unbalance is 1 mg or so, the acceleration of vibration is equal to or smaller than 2 G. Accordingly, when the volumetric ratio is equal to or smaller than 1% and the diametrical ratio is equal to or smaller than 2%, the acceleration of vibration is equal to or smaller than 2 G.

Table 1 shows the test results conducted by the applicant about the relation between the circularity of the ball race of the inner ring 8a relative to the perpendicularity of the end faces of the spacer 14 and the error in measurement of the unbalance of the rotor assembly 14. As seen from Table 1, when the perpendicularity of the end faces of the spacer is equal to or smaller than 0.1%, the circularity of the ball race of the inner ring 8a is equal to or smaller than 0.01% and the error in measurement of the unbalance of the rotor assembly 14 is equal to or smaller than 0.9 mg. The circularity of the ball race of the inner ring 8a and the error in measurement of the unbalance of the rotor assembly 14 in Table 1 have no relation to the provision of the clearance 13 between the rotor shaft 6 and the spacer 7.

TABLE 1

| No | Perpendicularity of spacer end face (%) | Circularity of inner ring ball race (%) | error in measurement of unbalance (mg) |
| --- | --- | --- | --- |
| 1 | 0.05 | 0.01 | 0.7 |
| 2 | 0.1 | 0.01 | 0.9 |
| 3 | 0.2 | 0.2 | 3.8 |

From the foregoing, it will be understood that according to the present invention it becomes possible to know a precise amount of the unbalance of the rotor assembly and accurately mend or correct the unbalance and therefore it becomes possible to prevent or at least reduce the vibration and noise of the tubocharger otherwise occuring.

What is claimed is:
1. A rotor assembly for a turbocharger comprising:
a rotor shaft having a shoulder at one end;
an inner ring of a ball bearing installed on said rotor shaft; and
a tubular spacer installed on said rotor shaft and secured to same by press fitting;
said tubular spacer having an end face which cooperates with said shoulder of said rotor shaft to hold therebetween said inner ring;
said spacer being constructed so that a perpendicularity of said end face relative to a center axis of said spacer is equal to or smaller than 0.1% of an inner diameter of said spacer.

2. The rotor assembly according to claim 1 wherein spacer having a second end face for contact with an inner ring of a second ball bearing to be installed on said rotor shaft, said second end face having a perpendicularity substantially similar to that of said first mentioned end face.

3. The rotor assembly according to claim 1, further comprising a turbine wheel installed on said rotor shaft at an end adjacent said inner ring of said first mentioned ball bearing.

4. A rotor assembly for a turbocharger comprising:
a rotor shaft having a shoulder at one end;
an inner ring of a ball bearing installed on said rotor shaft;
a tubular spacer installed on said rotor shaft and secured to same by press fitting;
said tubular spacer having an end face which cooperates with said shoulder of said rotor shaft to hold therebetween said inner ring; and
means for defining a clearance between said spacer and said rotor shaft so that said spacer is secured only at opposite end portions to said rotor shaft ánd in such a manner that a volume of said clearance is equal to or smaller than 1% of a volume of an inner space of said spacer.

5. A rotor assembly for a turbocharger comprising:
a rotor shaft having a shoulder at one end;
an inner ring of a ball bearing installed on said rotor shaft;
a tubular spacer installed on said rotor shaft and secured to same by press fitting;
said tubular spacer having an end face which cooperates with said shoulder of said rotor shaft to hold therebetween said inner ring; and
means for defining a clearance between said spacer and said rotor shaft so that said spacer is secured only at opposite end portions to said rotor shaft and in such a manner that (D2-D1) is equal to or smaller than 2% of D1 where D1 is an outer diameter of said rotor shaft and D2 is an inner diameter of said spacer.

* * * * *